US009302713B2

(12) United States Patent
Bird et al.

(10) Patent No.: US 9,302,713 B2
(45) Date of Patent: Apr. 5, 2016

(54) MULTIPLE AXIS HINGE ARRANGEMENT FOR A TRUCK HOOD

(75) Inventors: James Daniel Bird, Oak Ridge, NC (US); David John Critchley, Oak Ridge, NC (US); Nicholas H. Phillips, Stokesdale, NC (US)

(73) Assignee: VOLVO GROUP NORTH AMERICA, LLC, Greensboro, NC (US)

( * ) Notice: Subject to any disclaimer, the term of this patent is extended or adjusted under 35 U.S.C. 154(b) by 0 days.

(21) Appl. No.: 14/359,158

(22) PCT Filed: Nov. 29, 2011

(86) PCT No.: PCT/US2011/062348
§ 371 (c)(1),
(2), (4) Date: May 19, 2014

(87) PCT Pub. No.: WO2013/081582
PCT Pub. Date: Jun. 6, 2013

(65) Prior Publication Data
US 2014/0333096 A1    Nov. 13, 2014

(51) Int. Cl.
*B62D 25/10* (2006.01)
*B62D 25/12* (2006.01)
*E05D 3/10* (2006.01)

(52) U.S. Cl.
CPC *B62D 25/12* (2013.01); *E05D 3/10* (2013.01); *E05Y 2800/00* (2013.01); *E05Y 2900/516* (2013.01); *E05Y 2900/536* (2013.01); *Y10T 16/546* (2015.01); *Y10T 16/547* (2015.01)

(58) Field of Classification Search
CPC ...... B62D 25/10; B62D 25/12; B62D 25/105; E05D 3/10
USPC .................. 180/69.2, 69.21, 69.24
See application file for complete search history.

(56) References Cited

U.S. PATENT DOCUMENTS

| | | | |
|---|---|---|---|
| 1,795,208 A * | 3/1931 | Garner | 296/190.11 |
| 2,413,792 A | 5/1943 | Sharp | |
| 2,447,898 A | 3/1947 | Colaner, Sr. | |
| 2,769,503 A | 11/1956 | Wagner | |
| 3,398,846 A | 8/1968 | Ragan et al. | |
| 3,567,274 A | 3/1971 | Kaptur, Jr. et al. | |
| 4,099,760 A | 7/1978 | Mascotte et al. | |
| 4,319,653 A | 3/1982 | Carlson | |
| 5,620,219 A | 4/1997 | Servant | |
| 2006/0097526 A1 | 5/2006 | Connett et al. | |
| 2010/0005628 A1 * | 1/2010 | Jung | 16/386 |
| 2013/0025954 A1 * | 1/2013 | Miller et al. | 180/69.21 |

OTHER PUBLICATIONS

International search report and written opinion of corresponding PCT/US11/62348.

* cited by examiner

*Primary Examiner* — Bryan Evans
(74) *Attorney, Agent, or Firm* — Martin Farrell; Michael Pruden (57) ABSTRACT

A multiple axis hinge arrangement for a truck hood includes a first hinge arrangement and a second hinge arrangement laterally spaced and mounted at first and second sides, respectively, of a front end of a truck. The first and second hinge arrangements include horizontal hinge elements that support a truck hood for pivotal movement on a horizontal axis relative to a truck frame and include vertical hinge elements that provide vertical pivot axes. A coupling member is provided at each of the first and second hinge arrangements allowing the selected hinge arrangement to be uncoupled from the front end of the truck so the hood is free to pivot on the vertical axis of the coupled arrangement.

12 Claims, 7 Drawing Sheets

MULTIPLE AXIS HINGE ARRANGEMENT FOR A TRUCK HOOD

FIELD OF THE INVENTION

The invention relates to hoods for heavy trucks of the type that are hinged and pivot at a front end of the truck. More particularly, the invention relates to a hinge arrangement for a hood that provides a horizontal pivot axis and a vertical pivot axis allowing the hood to tilt forward and then swing laterally open.

BACKGROUND AND SUMMARY

Heavy trucks of the conventional engine-forward architecture typically have hoods that are hinged at the front of the truck frame, allowing the hood to be pivoted forward on a horizontal axis to an open position. These hoods are usually integrated with the fenders so that the hood/fender assembly pivots as a unit. While this allows access to the engine, there is room for improvement.

The invention provides a hinge arrangement for a truck hood that provides improved access to the engine and other components mounted near the engine.

More particularly, the invention provides a multiple axis hinge arrangement that allows a heavy truck hood to pivot on a horizontal axis to a forward open position, and then pivot on a vertical axis laterally to expose a front portion of the engine.

An arrangement in accordance with the invention includes a first hinge arrangement mounting a hood to a truck frame that provides relative pivotal movement on a horizontal axis, and a second hinge arrangement mounted to the hood and truck frame that provides pivotal movement of the hood on a vertical axis.

According to one aspect of the invention, the first hinge arrangement providing a horizontal pivot axis is interconnected to a hinge coupling member that mounts to a truck frame. Preferably, the hinge coupling member mounts to the front ends of both frame rails of the truck frame.

According to another aspect of the invention, the second hinge arrangement providing a vertical pivot axis is integrated with the hinge coupling member.

According to yet another aspect of the invention, the hinge coupling member includes on at least a first frame rail a securing device for releasably securing the hinge coupling member to the first frame rail. The second hinge arrangement includes a member interconnected with the hood and located on the second frame rail that provides a vertical pivot axis, wherein, the hinge coupling member may be released from the first frame rail of the truck frame to allow the hood to pivot on the vertical axis of the second hinge arrangement.

According to an embodiment of the invention, the hinge coupling member includes a securing device attached on each side of the truck frame and a second hinge arrangement attached at each side of the truck frame, permitting the hood to be selectively pivoted laterally leftward or rightward.

According to one embodiment, the hinge coupling member includes a first bracket mounted on the truck frame at a first side and a second bracket mounted on the truck frame on a second side, the first hinge arrangement including a first horizontal hinge attached to the first bracket and to the hood and a second horizontal hinge mounted to the second bracket and the hood, the first horizontal hinge and second horizontal hinge being oriented on a common pivot axis.

According to another embodiment, the hinge coupling member includes a bar extending from a first side of the truck frame to a second side of the truck frame, the first hinge arrangement being mounted to the bar and to the truck hood. The second hinge arrangement is integrated or mounted on a first side of the bar and a securing device mounted on a second side of the bar.

Alternatively, a second hinge arrangement and a securing device are mounted on the first side of the bar and on the second side of the bar, so that the hood may be laterally pivoted about either side. The first hinge arrangement may include a first hinge and a second hinge mounted to the bar in spaced relationship. Alternatively, the first hinge arrangement may include a single hinge mounted to the hood and to the bar, which may be suitable for smaller trucks.

BRIEF DESCRIPTION OF THE DRAWINGS

The invention will be better understood by reference to the following Detailed Description read in conjunction with the appended drawings, in which.

DETAILED DESCRIPTION

Figure 1:
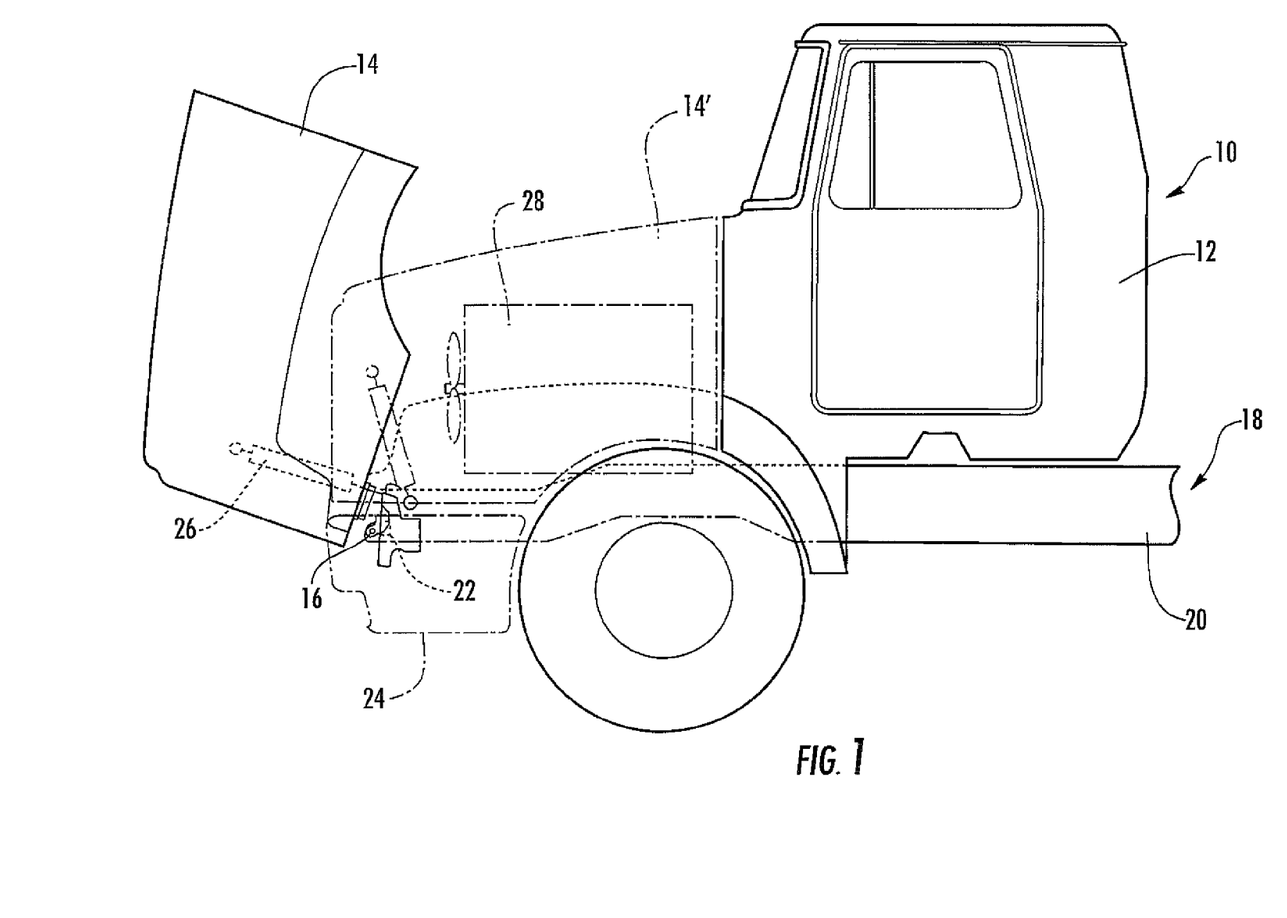
FIG. 1 is a side view of a truck having a hood hinged at a front of the truck frame.

FIG. 1 shows a simplified side view of a heavy truck 10, sectioned to illustrate only the front end, including the cab portion 12, hood 14, and engine 28. The hood 14 is mounted by a hinge 16 at the front of a truck frame 18. The hinge 16 is mounted at a front end 22 of a frame rail 20, and provides a horizontal pivot axis oriented laterally to a truck longitudinal axis (the horizontal axis is perpendicular to the drawing plane). The hinge 16 is shown on the front left of the truck frame 18 and another hinge (not illustrated) would be mounted to the front right of the truck frame. The hinge 16 allows the hood to pivot forward from a closed position (illustrated in broken lines as 14') to an open position as shown in solid lines. When in the open position, the hood 14 allows access to the engine 28 for service, repair, and the like. A bumper, including a bumper end cap 24 (only the end cap is visible), is mounted to the front end 22 of the frame 18 below the hood 14. The bumper end cap 24 is shown in broken line to reveal the hinge 16 and frame rail 20. A gas spring 26 helps counterbalance the weight of the hood 14. Other devices, such as torsion springs, may be used.

Figure 2:
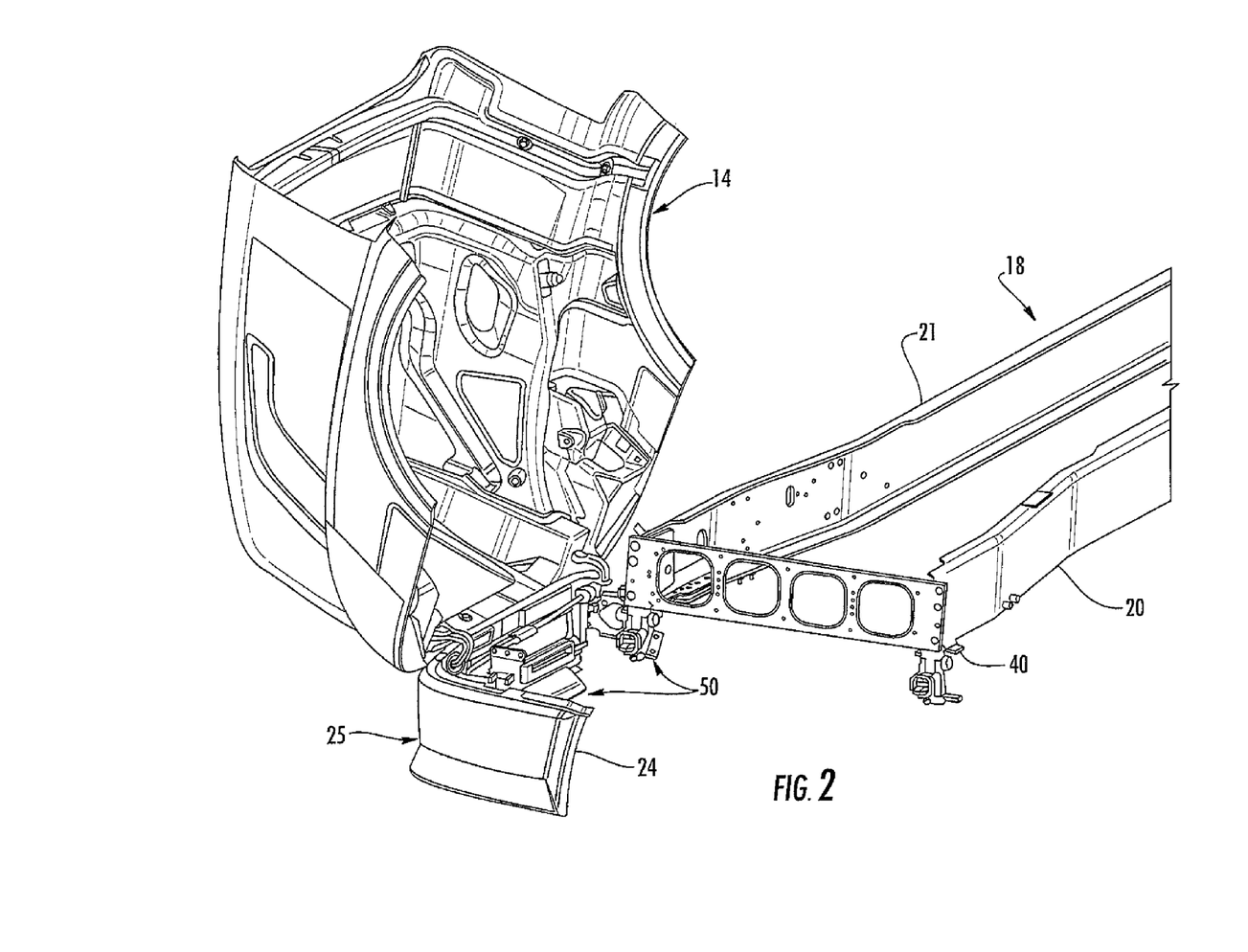
FIG. 2 is a perspective view of a hood and truck frame including a hinge assembly in accordance with the invention with the hood shown in a pivoted-open position.

FIG. 2 shows a perspective view of a hood 14 and frame 18 having a hinge assembly 50 in accord with the invention. As shown in FIG. 2, the hood 14 has been pivoted longitudinally forward in relation to the truck frame 18 to an open position as in FIG. 1, and then pivoted laterally, opening a front area of the engine compartment. The hood 14 is shown as laterally pivoted on a right side frame rail 21; however, as will become apparent, the hinge arrangement of the invention can allow pivoting alternatively on the left side frame rail 20, or alternately on either frame rail.

In FIG. 2, a bumper 25 and a bumper end cap 24 are shown mounted to the hinge assembly 50 so that the bumper 25 and bumper end cap 24 pivot laterally with the hood 14.

Figure 3:
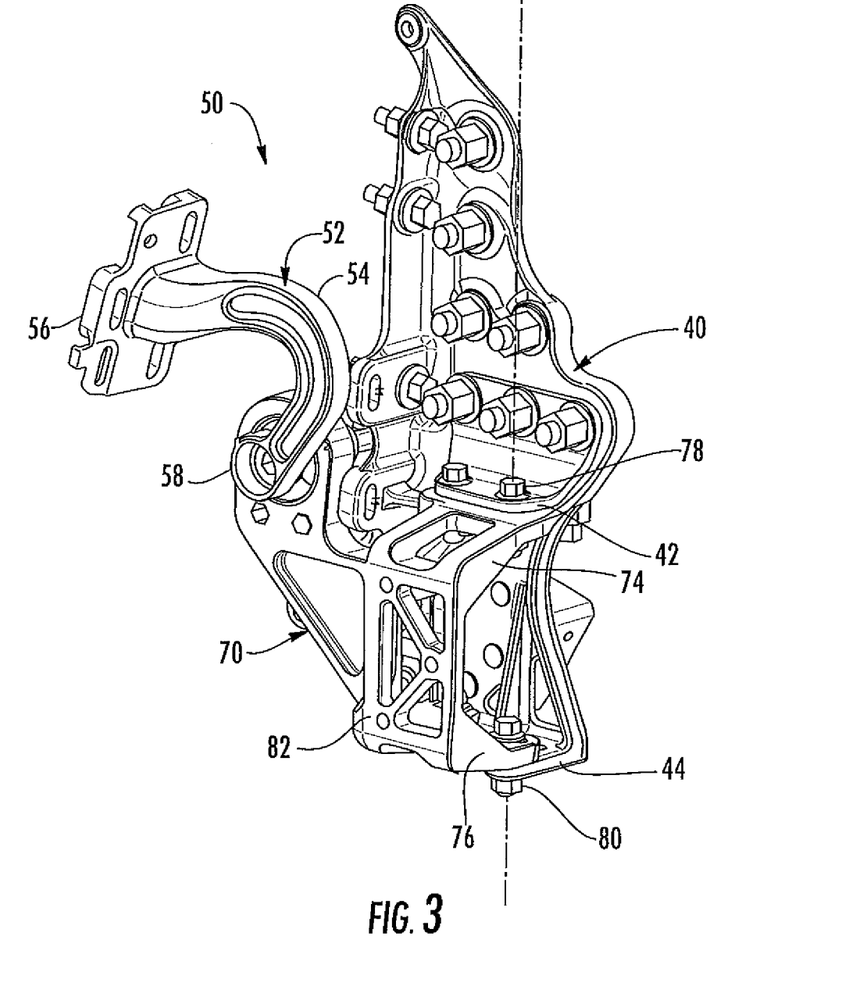
FIG. 3 is a perspective view of an embodiment of a hinge assembly of the invention for a left frame rail shown removed from the truck and in a pivoted-open position.

FIG. 3 illustrates an embodiment of a hinge assembly 50 of the invention in a perspective view from the rear and removed from the truck frame. The hinge assembly 50 is mounted to the truck frame (not illustrated) by way of a frame bracket 40. The hinge assembly 50 includes a vertical axis V for pivoting the hood as further described below. A hinge coupling member 70 is mounted to the frame bracket, both releasably and alternately for pivoting movement, as described in more detail below. The hinge coupling member 70 supports a hinge member 52 that attaches to the hood.

The hinge assembly 50, hinge coupling member 70, and frame bracket 40 shown in FIG. 3 represent a left side assembly (left being the driver side of the truck). A right side assembly is a mirror image of the illustrated left side assembly, and its construction will be understood by those skilled in the art without further description.

Figure 4:
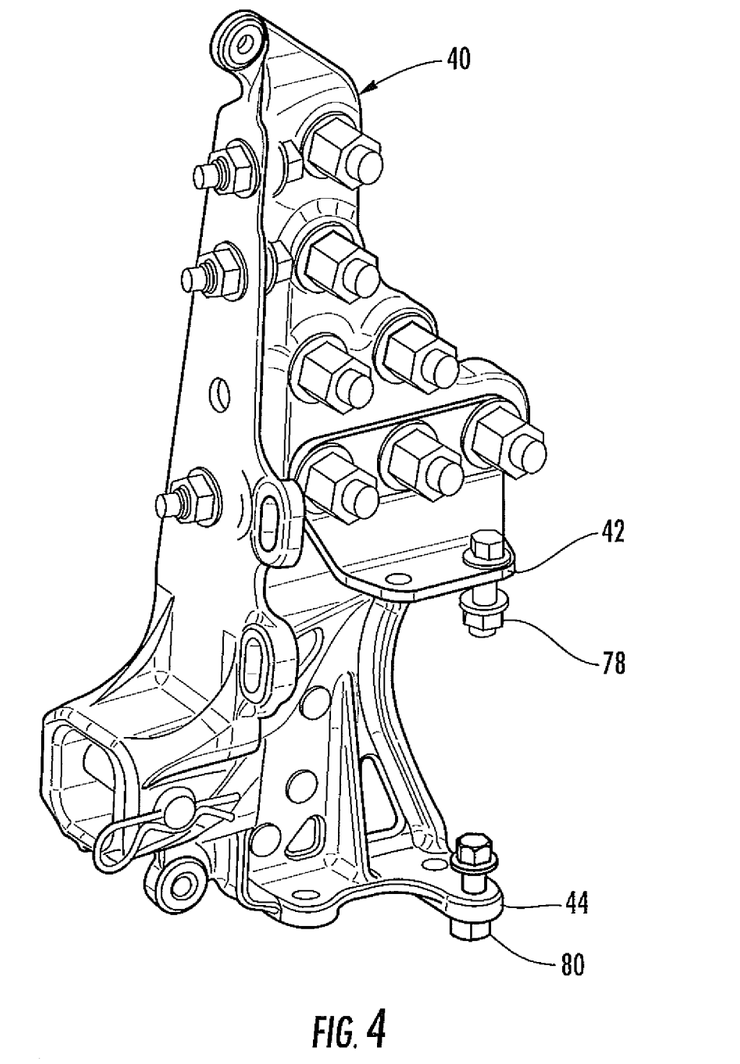
FIG. 4 is a perspective view of a frame bracket for the assembly of FIG. 3.

The frame bracket 40 is mounted to a frame rail (not shown in FIG. 3) and, as is known in the art, may include mounting support structure for components located at the front of the truck, for example, the radiator and the front cross member. Referring now also to FIG. 4, in which the hinge coupling member 70 is removed, the frame bracket 40 of the illustrated embodiment includes an upper bracket 42 and a lower bracket 44 extending horizontally from the frame bracket. The upper bracket 42 and lower bracket 44 are vertically spaced and have mounting holes that are vertically aligned. The upper bracket 42 and lower bracket 44 support the hinge coupling member 70. The frame bracket 40 is normally intended to be permanently fixed to the frame rail; accordingly, it is considered for the purposes of the invention a part of the frame.

Figure 5:
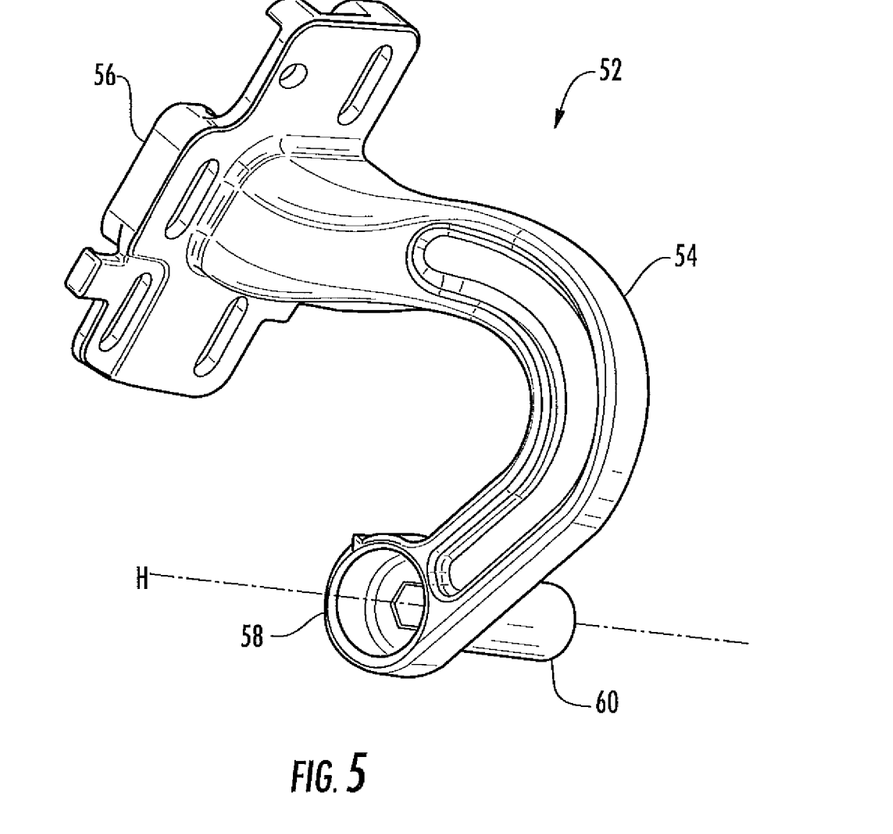
FIG. 5 is a perspective view of a hinge member for the assembly of FIG. 3.

The hinge assembly 50 includes the first hinge 52 that provides a horizontal pivotal axis. As shown in FIG. 5, the first hinge 52 is formed as a J-hook, having a J-shaped body 54, a base 56 for mounting the J-hook to the hood, and a hub 58 that pivots on a pin 60. The pin 60 defines a horizontal axis H for pivoting the hood between the longitudinally forward open and rearward closed positions.

Figure 6:
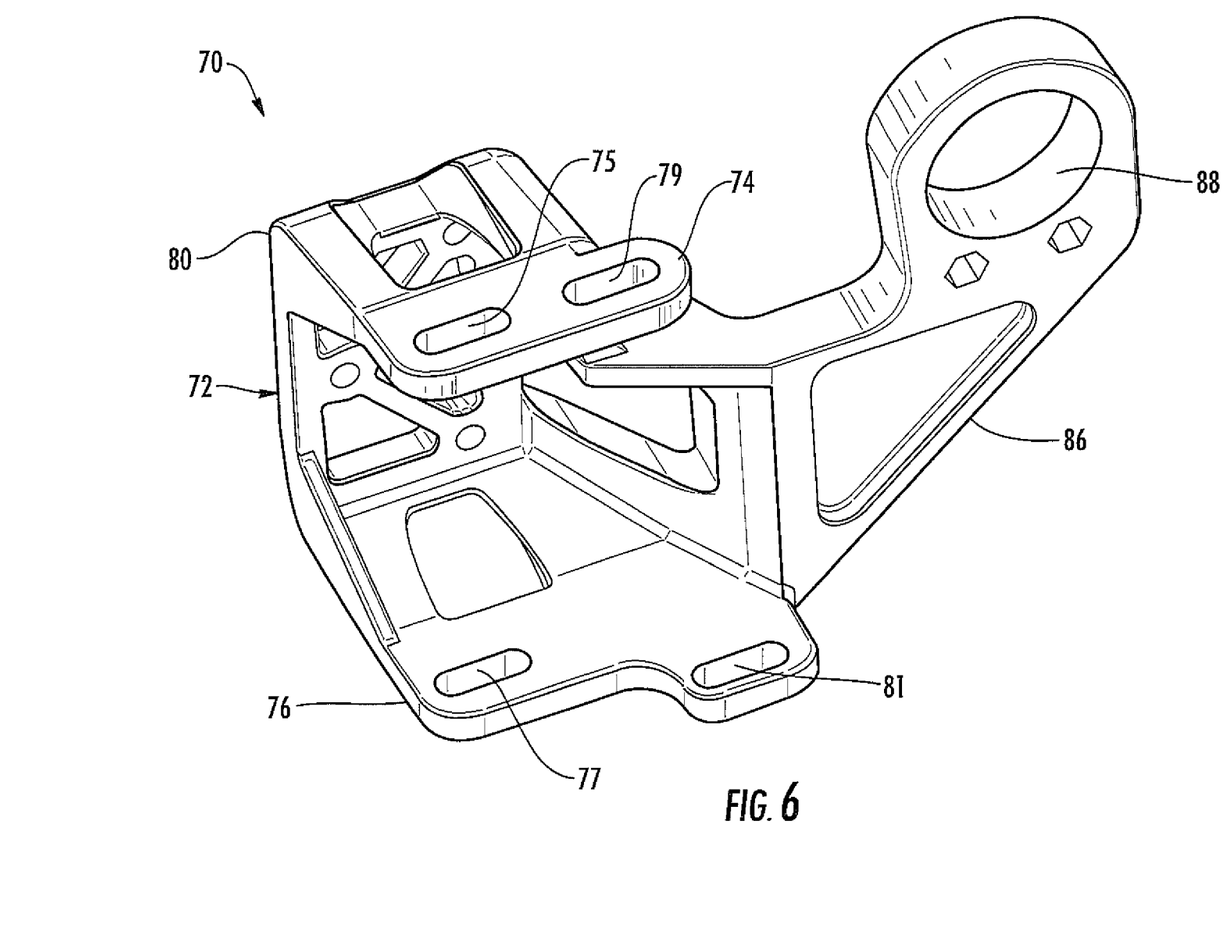
FIG. 6 is a perspective view of a coupling member of the hinge assembly of FIG. 3; and, FIG. 7 is a perspective view of an alternative coupling member mounted on a frame bracket.

Referring again to FIG. 3, the hinge coupling member 70 connects the first hinge 52 to the frame bracket 40 by way of the pin 60, as explained below. Turning also to FIG. 6, the hinge coupling member 70 includes a body 72 mounted to the frame bracket 40 for pivoting movement on a vertical axis V (indicated in FIG. 3). The body 72 includes an upper leg 74 and a lower leg 76 that connect to the upper bracket 42 and lower bracket 44, respectively, of the frame bracket 40. A hole 75 in the upper leg 74 is vertically aligned with a hole 77 in the lower leg 76. A vertical hinge arrangement may include an upper hinge pin 78 extending through the hole 75 in the upper leg 74 to connect the upper leg to the upper bracket 42 and a lower hinge pin 80, (see, FIG. 3 and FIG. 4), extending through the hole 77 in the lower leg 76 to connect the lower leg to the lower bracket 44. The hinge pins 78, 80 may be configured as bolts, as shown. Alternatively, a single hinge pin may extend through and connect the brackets 42, 44 and legs 74, 76.

The body 72 includes a face 82 on which a bumper or bumper end cap support may be connected, which includes a plurality of mounting holes for fasteners (not illustrated).

The hinge coupling member 70 includes a hinge support arm 86 extending forwardly of the body 72. The hinge support arm 86 includes a bore 88 to support the pin 60 and interconnect with the hub 58 of the first hinge member 52.

According to the illustrated embodiment of FIG. 2, a hinge assembly 50, including a first hinge member 52 and hinge coupling member 70, is mounted on a front end of a left frame rail and a second hinge assembly is mounted to a right frame rail of a truck frame. As shown, the hinge coupling member 70 of the left frame rail 20 is detached from the frame bracket 40.

According to the invention, the hinge coupling member 70 is releasably connected to the frame bracket 40 by the hinge pins 78, 80. Optionally, an additional single fastener or two fasteners may be used with holes 79, 81 in the upper leg 74 and lower leg 76. By removing the hinge pins 78, 80 (or optional single pin) and additional optional fasteners, the hinge coupling member 70 is released from the frame bracket 40. The opposite side hinge coupling member, still supported by the vertical hinge (hinge pins 78, 80 or a single pin) is then free to pivot on the vertical hinge axis V, allowing the hood to pivot laterally. If an additional fastener or fasteners are used to secure the opposite side coupling member (as described for the coupling member 70, above), it would be necessary to remove the additional fasteners to allow the opposite side coupling member to pivot.

According to another embodiment of the invention, the left side and right side hinge assemblies may be interconnected by a bridging member, for example, a bar. This allows the first hinge members to be positioned at a position other than mounted to the frame brackets at the front of the right and left frame rails, if desired.

Figure 7:
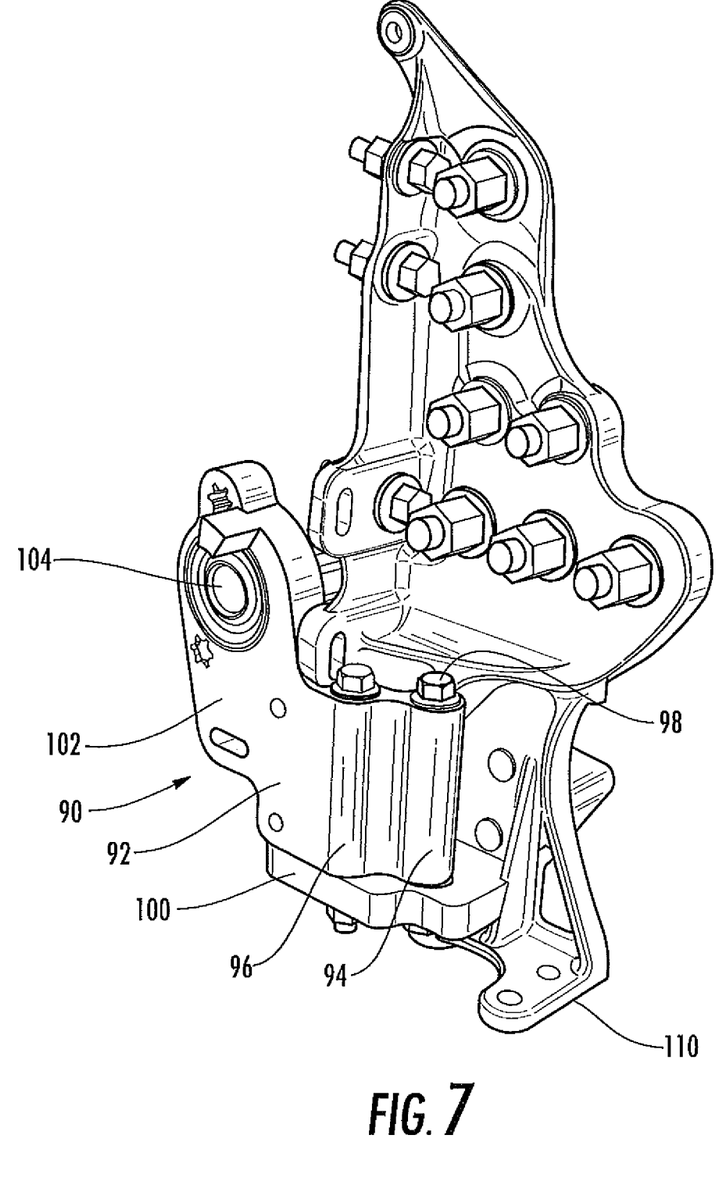

The illustrated hinge coupling member 70 is shown is for the purposes of description of an embodiment of the invention. A hinge coupling member suitable for the invention includes a portion to support the first hinge member 52 and a portion to mount to the vehicle frame for pivoting movement. Configurations other than as illustrated that satisfy these functions are encompassed by the invention. For example, FIG. 7 shows an alternative hinge coupling member 90 having a body 92 formed as a block or plate having two parallel cylindrical bores 94, 96. A first bore 94 supports a hinge pin 98 and a second bore carries a fastener 99 for releasably securing the member 90 to a plate 100. The plate 100 is mounted to a lower bracket 110 of the frame bracket 112. An upper arm for the frame bracket as in FIGS. 3 and 4 is omitted. A hinge support arm 102 for extends forward of the body 92. The hinge support arm 102 includes a bore 104 to support the pin 60 and interconnect with the hub 58 of the first hinge member 52 of FIG. 5.

The invention has been described in terms of preferred principles, embodiments, and components. Those skilled in the art will understand that substitutions of specific components may be made without departing from the scope of the invention as defined in the appended claims.

What is claimed is:

1. A multiple axis hinge arrangement for a truck hood, comprising:
   a first hinge arrangement mountable to a truck hood and a truck frame front end defining a horizontal pivot axis relative to the truck allowing the hood to be pivoted between an longitudinally open position and a closed position;
   a second hinge arrangement having a hinge point defining a vertical pivot axis mountable at a first side of the truck frame;
   a securing device mountable at a second side of the truck frame for releasably securing the hood to the truck frame to allow the hood to pivot on the vertical axis in a lateral direction relative to the truck between a laterally open position and a closed position; and,
   a coupling device mountable to the truck frame, the first hinge arrangement mounted to the coupling device for pivotal movement relative to the coupling device, wherein the coupling device comprises the second hinge arrangement and the securing device.

2. The multiple axis hinge arrangement for a truck hood of claim 1, wherein the first hinge arrangement comprises a first hinge member and a second hinge member each mountable to a front of the truck frame.

3. The multiple axis hinge arrangement of claim 1, comprising a first coupling member mountable on a first frame rail and a second coupling member mountable on a second frame rail of the truck frame, wherein the second hinge arrangement comprises a hinge pin connecting the first coupling member to the first frame rail.

4. The multiple axis hinge arrangement of claim 3, wherein the securing device comprises fasteners releasably securing the second coupling member to the second frame rail.

5. The multiple axis hinge arrangement of claim 4, wherein the second hinge arrangement comprises a hinge pin connecting the second coupling member to the second frame rail and the securing device comprises fasteners releasably securing the first coupling member to the first frame rail.

6. The multiple axis hinge arrangement of claim 1, wherein the first hinge arrangement comprises a hinge member mounted to each coupling device and wherein each hinge member is mountable to the truck hood.

7. The multiple axis hinge arrangement of claim 1, wherein, the coupling device includes mounting means for a truck bumper.

8. A multiple axis hinge arrangement for a truck hood, comprising:
   a first hinge and a second hinge laterally spaced and mounted at first and second sides, respectively, of a front end of a truck frame to support a truck hood for pivotal movement relative to the truck frame, the first hinge and second hinge providing a horizontal pivot axis;
   a third hinge arranged at the first side of the truck hood and providing a vertical pivot axis; and,
   a securing device provided at the second side of the truck hood allowing the second side of the hood to be uncoupled from the front end of the truck,
   wherein, the hood may be pivoted to a forward open position on the first hinge and second hinge, then pivoted to a laterally open position on the third hinge when the securing device releases the second side.

9. The multiple axis hinge arrangement of claim 8, further comprising:
   a fourth hinge arranged at the second side of the truck hood and providing a second vertical pivot axis; and,
   a second securing device at the first end allowing the first side of the hood to separate from the front end of the truck,
   wherein the hood may be pivoted to a forward open position on the first hinge and second hinge, then pivoted to a laterally open position on the fourth hinge when the second securing device releases the first side.

10. A truck having a hood with a multiple axis hinge arrangement, comprising:
    a truck frame having first and second laterally spaced frame rails, each frame rail having a front end;
    a hood having a front end;
    a first hinge coupler mounted to the first frame rail and forming a vertical pivot;
    a first hinge mounted to the front end of the hood and to the first hinge coupler, the first hinge allowing relative pivotal movement between the hood and the first hinge coupler;
    a second hinge coupler releasably mounted to the second frame rail;
    a second hinge mounted to the front end of the hood and to the second hinge coupler, the second hinge allowing relative pivotal movement between the hood and the second hinge coupler, wherein the first hinge and second hinge provide a single horizontal pivot axis at the front end of the hood, and
    wherein the hood is longitudinally pivotable on the horizontal axis between a closed position and a forward open position, and
    wherein, with the hood in the forward open position and with the second hinge coupler released from the second frame rail, the hood is laterally pivotable on the vertical axis away from the front end of the truck.

11. A multiple axis hinge arrangement for a truck hood, comprising:
    a first hinge arrangement mountable to a truck hood and a truck frame front end defining a horizontal pivot axis relative to the truck allowing the hood to be pivoted between an longitudinally open position and a closed position;
    a second hinge arrangement having a hinge point defining a vertical pivot axis mountable at a first side of the truck frame;
    a securing device mountable at a second side of the truck frame for releasably securing the hood to the truck frame to allow the hood to pivot on the vertical axis in a lateral direction relative to the truck between a laterally open position and a closed position; and,
    a first coupling member mountable on a first frame rail and a second coupling member mountable on a second frame rail of the truck frame, wherein the second hinge arrangement comprises a hinge pin connecting the first coupling member to the first frame rail;
    wherein the securing device comprises fasteners releasably securing the second coupling member to the second frame rail.

12. The multiple axis hinge arrangement of claim 11, wherein the second hinge arrangement comprises a hinge pin connecting the second coupling member to the second frame rail and the securing device comprises fasteners releasably securing the first coupling member to the first frame rail.

* * * * *